(12) United States Patent
Canini et al.

(10) Patent No.: US 7,102,116 B2
(45) Date of Patent: *Sep. 5, 2006

(54) DEVICE AND METHODS FOR THE ACQUISITION AND AUTOMATIC PROCESSING OF DATA OBTAINED FROM OPTICAL CODES

(75) Inventors: Federico Canini, Zola Predosa (IT); Marco Piva, Pennabilli (IT); Rinaldo Zocca, Argelato (IT)

(73) Assignee: Datalogic S.p.A., Lippo di Calderara di Reno (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/816,908

(22) Filed: Apr. 5, 2004

(65) Prior Publication Data

US 2004/0245431 A1 Dec. 9, 2004

Related U.S. Application Data

(63) Continuation of application No. 10/247,681, filed on Sep. 20, 2002, and a continuation of application No. 09/432,105, filed on Nov. 2, 1999, now Pat. No. 6,512,218.

(30) Foreign Application Priority Data

Nov. 2, 1998 (EP) ............................................. 98830665

(51) Int. Cl.
*H01L 27/00* (2006.01)

(52) U.S. Cl. ..................................... 250/208.1; 348/307

(58) Field of Classification Search ............... 250/208.1; 348/307–309
See application file for complete search history.

(56) References Cited

U.S. PATENT DOCUMENTS

| 5,262,871 A | * | 11/1993 | Wilder et al. ................ 348/307 |
| 5,463,214 A | | 10/1995 | Longacre, Jr. et al. |
| 5,521,366 A | * | 5/1996 | Wang et al. ................. 235/454 |

(Continued)

FOREIGN PATENT DOCUMENTS

| WO | WO 9708647 A | 3/1997 |
| WO | WO 9816896 | 4/1998 |
| WO | WO 99/64980 | 12/1999 |

OTHER PUBLICATIONS

International Search Report dated Mar. 1, 2006 for European Patent Application No. 05013873.4.
U.S. Appl. No. 10/247,681, filed Jul. 12, 2005, Federico Canini, in co–pending.
Fossum, E.R., "CMOS Active Pixel Image Sensors" Nuclear Instruments & Methods in Physics Research, Sec. A, vol. 395, 1997 pp. 291–297.

*Primary Examiner*—Stephone B. Allen
(74) *Attorney, Agent, or Firm*—Duane Morris LLP

(57) ABSTRACT

The device for the acquisition and automatic processing of data obtained from optical codes comprises a CMOS optical sensor; an analog processing unit connected to the optical sensor; an analog/digital conversion unit connected to the analog processing unit; a logic control unit connected to the CMOS optical sensor, the analog processing unit and the analog/digital conversion unit; and a data-processing unit connected to the logic control unit and the analog/digital conversion unit. The CMOS optical sensor and at least one of the analog processing, analog/digital conversion, logic control and data processing units are integrated in a single chip. The data processing unit processes the digital signals corresponding to the image acquired by the CMOS sensor and e the optically coded data.

46 Claims, 9 Drawing Sheets

U.S. PATENT DOCUMENTS

| | | |
|---|---|---|
| 5,702,059 A | 12/1997 | Chu et al. |
| 5,703,349 A | 12/1997 | Meyerson et al. |
| 5,723,853 A | 3/1998 | Longacre, Jr. et al. |
| 5,756,981 A * | 5/1998 | Roustaei et al. ....... 235/462.42 |
| 5,773,806 A | 6/1998 | Longacre, Jr. |
| 5,773,810 A | 6/1998 | Hussey et al. |
| 5,793,033 A | 8/1998 | Feng et al. |
| 5,900,613 A | 5/1999 | Koziol et al. |
| 5,949,057 A | 9/1999 | Feng |
| 6,053,408 A | 4/2000 | Stoner |
| 6,097,856 A | 8/2000 | Hammond, Jr. |
| 6,512,218 B1 * | 1/2003 | Canini et al. ............ 250/208.1 |

* cited by examiner

DEVICE AND METHODS FOR THE ACQUISITION AND AUTOMATIC PROCESSING OF DATA OBTAINED FROM OPTICAL CODES

This application is a continuation of applications Ser. Nos. 10/247,681 filed Sep. 20, 2002 and 09/432,105, filed Nov. 2, 1999 now U.S. Pat. No. 6,512,218. The entire contents of both applications are hereby incorporated herein by reference.

The present invention relates to a device and a method for the acquisition and automatic processing of data obtained from optical codes.

Hereinafter, the term "optical code" indicates any graphic representation which has the function of storing coded data. A specific example of an optical code comprises linear or two-dimensional codes, wherein data is coded by appropriate combinations of elements with a predetermined shape, i.e. square, rectangles or hexagons, of dark colors (normally black), separated by light elements (spaces, normally white), such as bar codes, stacked codes (including PDF417), Maxicodes, Datamatrix, QR codes, or color codes etc. More generally, the term "optical code" further comprises other graphic forms with a data-coding function, including uncoded printed characters (letters, numbers etc.) and specific shapes (patterns) (such as stamps, logos, signatures etc).

In order to acquire optical data, optical sensors are required, converting the data coding image into electric signals, correlated to the brightness of the image dots, which can be automatically processed and decoded (through electronic processors).

BACKGROUND OF THE INVENTION

At present, optical sensors are manufactured using CCD 30 (Charge Coupled Device) technology. However, these sensors have disadvantages caused by a not always satisfactory reading performance, complexity, cost and size of the entire reading device.

Furthermore, for the manufacture of optical sensors it has already been proposed to use the CMOS technology, presently employed only in integrated electronic circuits. Hitherto. however, CCD technology has been preferred to CMOS technology, since its performance is better as to quantic efficiency, optical "fill factor" (i.e. the fraction of the useful area occupied by the individual detection element or pixel in order to acquire optical data), dark current leakage, reading noise and dynamics.

Recently, active pixel CMOS sensors (with an amplification section inside the pixel) have been developed, which have performance levels competitive with CCD sensors, but far greater functional capabilities. An image acquisition device can be divided into two parts, i.e. a (linear or matrix-type) optical sensor, supplying output electric signals correlated to the received light, and a unit for processing the electric signals. With the CCD technology used hitherto, whenever the processing unit has to collect data from the optical sensor it must access all the pixels forming the optical sensor in a predetermined sequence. On the other hand, CMOS technology allows the processing unit to access any pixel directly, without having to comply with a specific order, and without the need to access all the existing pixels. In addition, CMOS sensors are fully compatible with logic circuits produced using CMOS technology itself.

SUMMARY OF THE INVENTION

The object of the invention is thus to provide a device and a method for acquiring optical data, exploiting the intrinsic advantages of CMOS technology, compared with CCD technology.

According to the present invention, a device is provided for the acquisition and automatic processing of data from optical codes, characterized, in combination, by:

a CMOS optical sensor;

an analog processing unit connected to said CMOS optical sensor;

an analog/digital conversion unit connected to said analog processing unit; and a data-processing unit, connected to said analog/digital conversion unit The CMOS sensor can be of linear or matrix type; the device is also provided with a display unit and a keyboard and/or a mouse. An interface permits connection to radio, telephone, GSM or satellite systems.

The CMOS sensor and at least one of the analog and digital image processing units, are preferably integrated in a single chip; consequently the device is cheap, fast and less sensitive to noise.

The device initially advantageously acquires low-resolution images; in the low-resolution images, it looks for interest regions; then it acquires high-resolution images in the interest regions and decodes data in the high-resolution images.

According to the invention, a method is also provided for automatically acquiring data obtained from optical codes, comprising the steps of generating an analog electric signal correlated to the brightness of an image through a CMOS optical sensor; processing said analog electric signal in an analog manner; converting said analog electric signal to a digital signal; and processing said digital signal to extract coded optical data.

In addition, the invention relates to a device for automatic acquisition of data obtained from optical codes, characterized, in combination, by:

a CMOS optical sensor;

an analog processing unit connected to said CMOS optical sensor; and an analog/digital conversion unit connected to said analog processing unit.

BRIEF DESCRIPTION OF THE DRAWINGS

Further characteristics of the invention will become apparent from the description of some preferred embodiments, provided purely by way of no example and illustrated in the attached drawings, wherein.

DETAILED DESCRIPTION OP THE INVENTION

Figure 1:
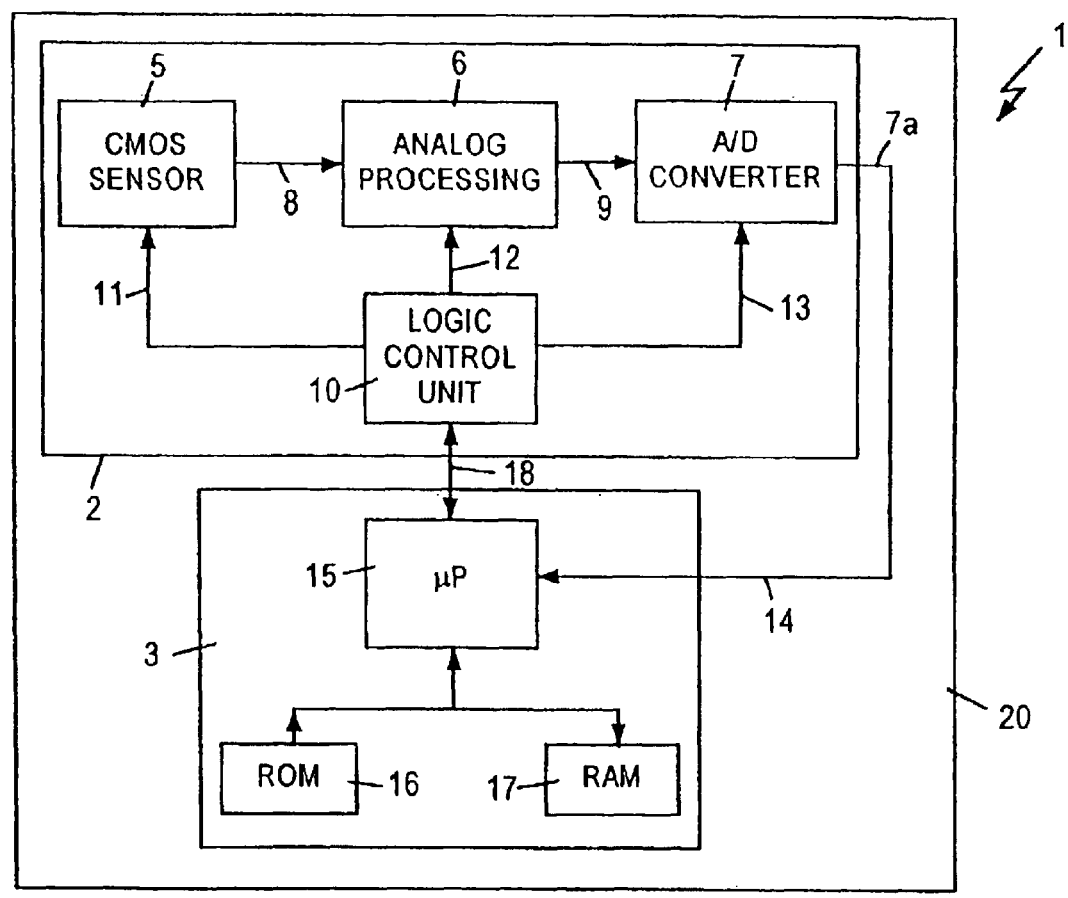
FIG. 1 shows a block diagram of a device for the 10 acquisition and automatic processing of data according to a first embodiment of the invention.

In FIG. 1, a device 1 for acquisition and automatic processing of data comprises an image detector 2 and a processing unit 3. In turn, the image detector 2 comprises, in cascade with one another, a CMOS sensor 5, an analog processing unit 6 and an A/D converter 7.

In detail, the CMOS sensor 5, of known type, comprises a linear or matrix-type array of sensing elements produced using CMOS technology and intended to provide each an image element (pixel). Hereinafter, for the sake of simplicity of description, the term pixel indicates both the image elements taken from each sensing element and the sensing elements themselves. The CMOS sensor 5 then supplies at the output an analog signal correlated to the quantity of light incident on the sensing elements themselves.

The analog processing unit 6, receiving the output * signal from CMOS sensor 5 on a line 8, has the function of adapting the output signal from CMOS sensor 5 and allowing subsequent digital conversion of the signal; in particular, it serves the purpose of making the signal compatible with 30 the voltage values required by the A/D converter 7, through automatic gain control; eliminating the (thermal arid electro magnetic) noise generated inside CMOS sensor 5, or picked up from the exterior, and modifying the signal to compensate blurring or excessive image definition.

A/D converter 7, connected to the output of the analog processing unit 6 via a line 9, transforms the analog signal supplied by the analog processing unit 6 into a succession of digital pulses, by sampling the analog signal at suitable moments and coding the data in digital form. In particular, 5 in the simplest case, A/D converter 7 can also use a single bit (and supply only a white/black data), but more generally it is a N bit converter (e.g. 4, 6, 8, 10, 12, 16).

A digital logic control unit 10 is connected to CMOS 10 sensor 5, to analog processing unit 6 and to A/D converter 7, through respective lines 11–13, and supplies them with control signals necessary for their operation, for example activation and synchronism signals. Logic control unit 10 comprises hardware and software components for managing blocks 5–7 and can also carry out very complex tasks.

The output 7a of A/D converter 7 is connected to a microprocessor 15, belonging to the processing unit 3 and connected to an own ROM memory 16 for program storing, and to an own RAM memory 17 for storing data, digital image and program information during execution. Microprocessor 15 is connected to logic control unit 10 via a line 18 and supplies control signals for acquiring the signals associated with all the pixels (frame), or acquiring the signals associated only with some specific pixels, as described hereinafter in greater detail with reference to FIG. 11. Depending on the application, microprocessor 15 can also control pixel acquisition in non-consecutive order. In addition, it processes the digital image data, extracts the coded data 30 from the acquired image and optionally processes this data according to known algorithms.

In the device 1, CMOS sensor 5 and at least one of the elements of the image detector 2 and/or the processing unit 3, are integrated in a single chip. In the example illustrated in FIG. 1, for example the entire device 1, including the image detector 2 arid the processing unit 3, is integrated in a single chip 20.

The device 1 is thus very compact and has lower 5 production costs and a high image processing speed, due to the closeness of the components and lack of external connections.

Figure 2:
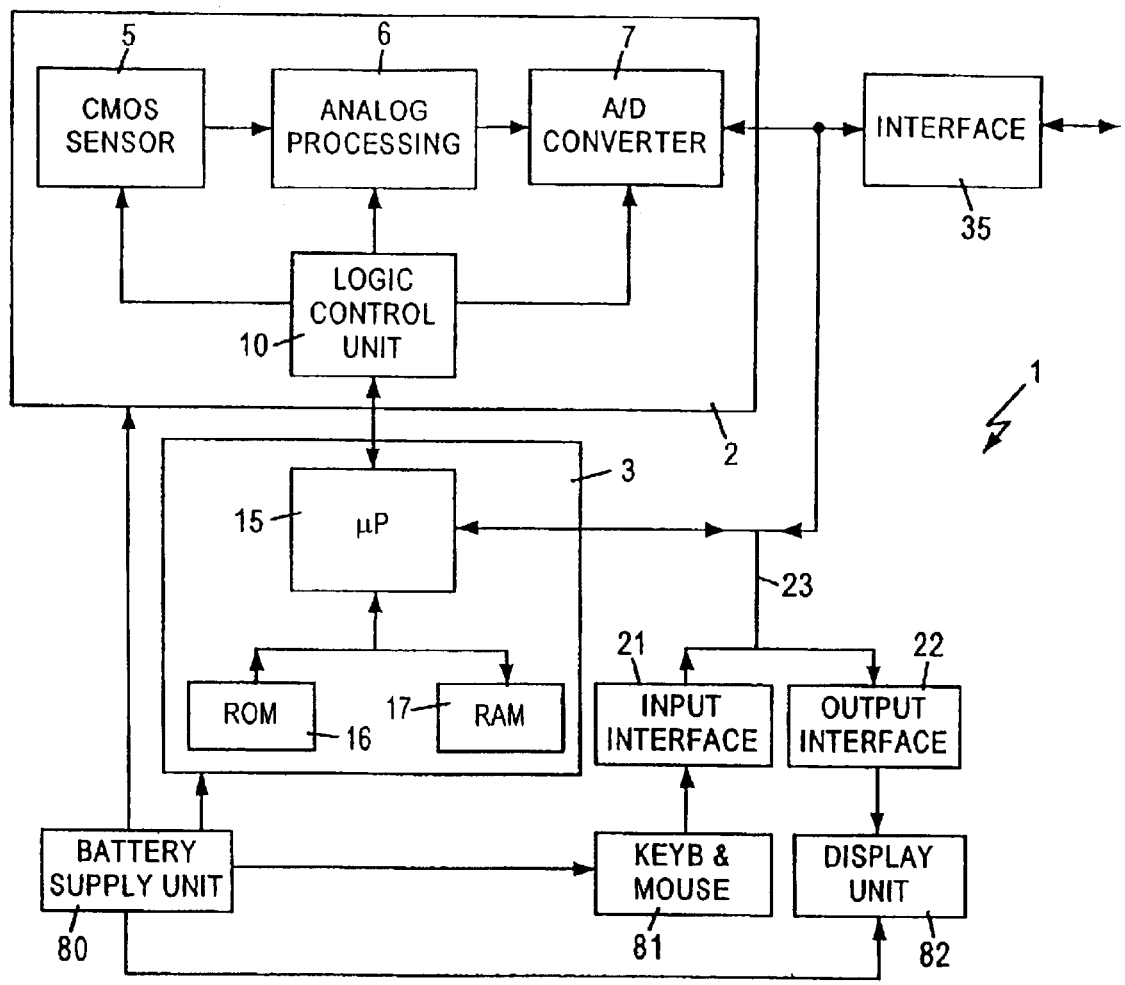
FIG. 2 shows a block diagram of the device according to a second embodiment of the invention.

FIG. 2 shows a device 1 including, in addition to the blocks shown in FIG. 1, a battery supply unit 80, connected to the image detector 2 and to the processing unit 3, for supplying power to device 1, and two user interfaces, specifically an input interface 21 and an output interface 22, also supplied by the battery supply unit 80, in a manner not shown. The input interface 21 is connected to an input device 81, for example a keyboard or a mouse, for inputting data and commands; the output interface 22 is connected to an output device 82, typically a display unit, to display a text and/or images. The input interface 21 and output interface 22 are connected to the microprocessor 15 via a data and control bus 23.

The device 1 of FIG. 2 is also provided with a data transfer and control interface 35, for remote transmission and receipt to/from other devices or to/from a central unit (not shown); typically this interface permits dispatch of data extracted from the image acquired by microprocessor 15.

In this case also, the CMOS sensor 5 can be of the 30*linear or matrix type.

Figure 3:
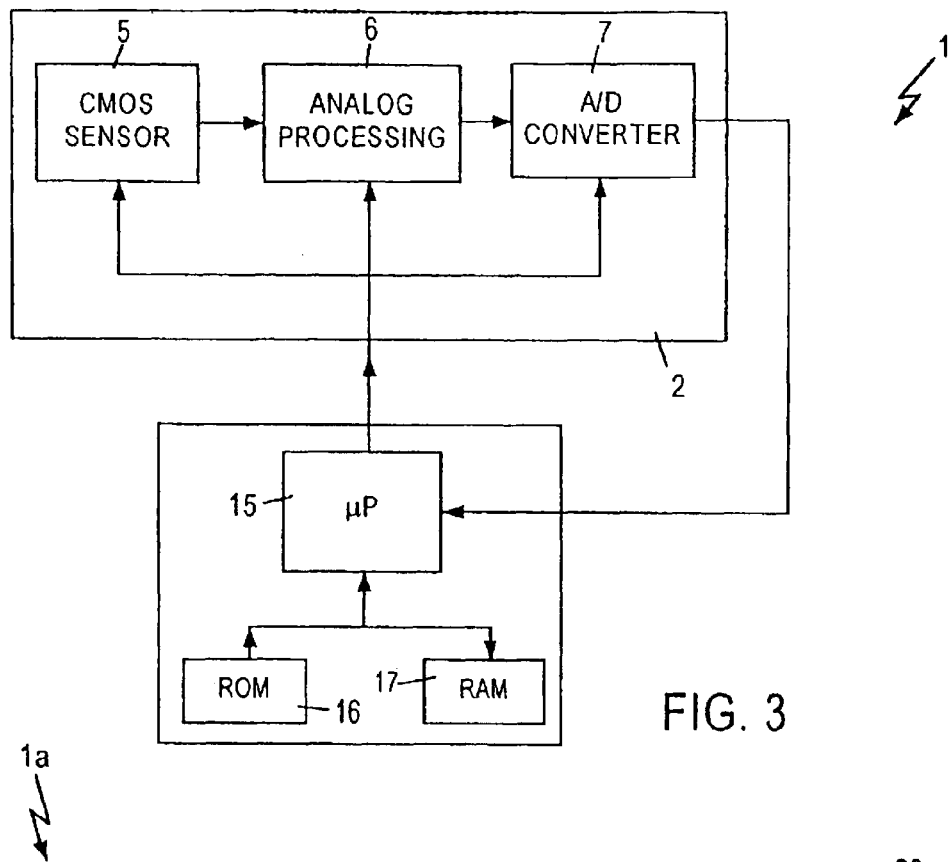
FIG. 3 shows a block diagram of the device according to a third embodiment of the invention.

FIG. 3 shows an embodiment wherein, instead of being concentrated in an appropriate unit—(logic control unit 10), the logic control unit is distributed within blocks forming CMOS sensor 5, analog processing unit 6 and A/D converter 7. The logic control unit 10 is thus eliminated and microprocessor 15 is interfaced directly with blocks 5,6 and 7.

According to a variant, also shown in the block diagram 5 of FIG. 3, the logic control unit is provided inside the microprocessor 15. Therefore, also here, microprocessor 15 is interfaced directly with blocks 5, 6 and 7. This variant is advantageous when it is necessary to produce a 1 number of devices 1 according to the invention; in fact, in this case, it is possible to produce a custom microprocessor component having hardware resources suitable for direct connection to the image detector 2.

Figure 4:
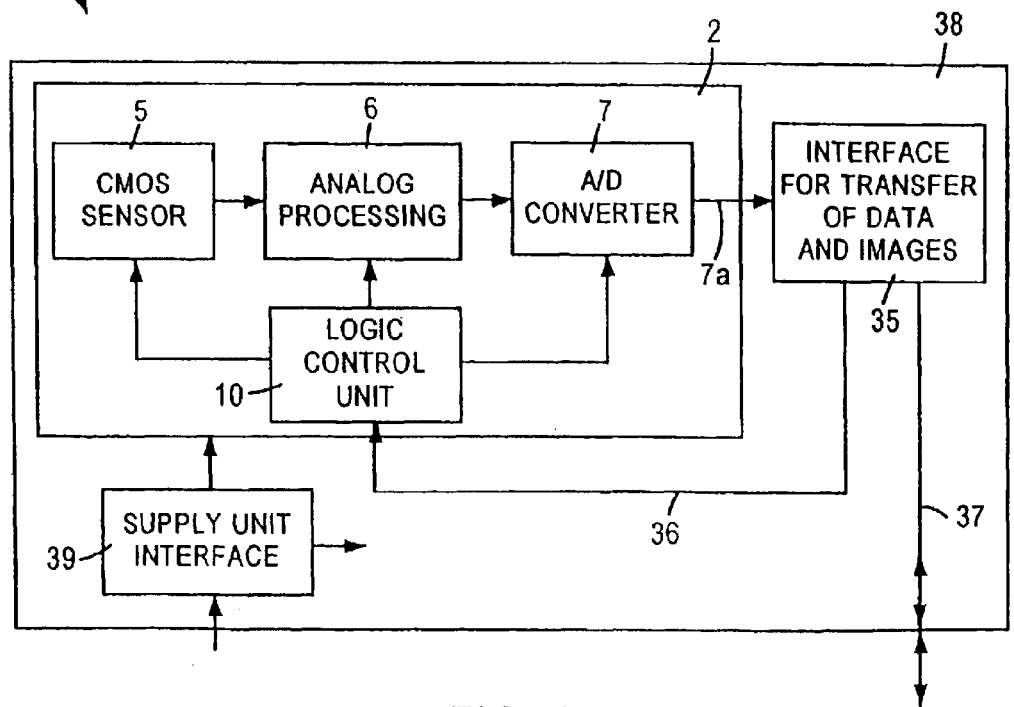
FIG. 4 shows a block diagram of the device according to a fourth embodiment of the invention.

FIG. 4 shows a device 1a formed only by the image detector 2, wherein output 7a of A/D converter 7 is connected to a data transfer and control interface 35. Data transfer and control interface 35 is also connected to the control unit 10 via a line 36 and to a personal computer (not shown) via a line 37. The data transfer and control interface 35 can for example be a USB, IEEE 1394 or SCSI interface; as an alternative a RAM interface can be provided, which allows the personal computer to collect directly the digital data supplied by the A/D conversion unit 7, or a DMAC interface. In addition, the data transfer and control interface 35 can also be a radio interface, a telephone interface, or a GSM or satellite interface.

Image detector 2 and data transfer and control interface 35 are advantageously integrated in a single chip 38. In the illustrated example, device 1a of FIG. 4 is supplied directly by the personal computer, via a supply interface 39 connected to the personal computer (not shown) and supplying the necessary voltage to all blocks of FIG. 4. As an alternative, device 1a can be supplied via data transfer and control interface 35, or directly via the battery interface and thus be provided with a supply unit block similar to block 80 of FIG. 2 (in a manner not shown).

The device 1a of FIG. 4 can also be provided with input and output interfaces, similarly to interfaces 81 and 82 of FIG. 2.

Data transfer and control interface 35 transfers the images acquired to the personal computer and receives the commands from the latter, so as to allow image processing (for example in the manner described in greater detail hereinafter with reference to FIG. 7) by the personal computer. This solution is advantageous when there is already a personal computer available for further processing (for example statistics, (computation etc), which can conveniently also be required to carry out the task of image processing, thus simplifying and reducing dimensions and cost of the device 1a simply those of image detector 2 and optionally transfer interface 35.

Figure 5:
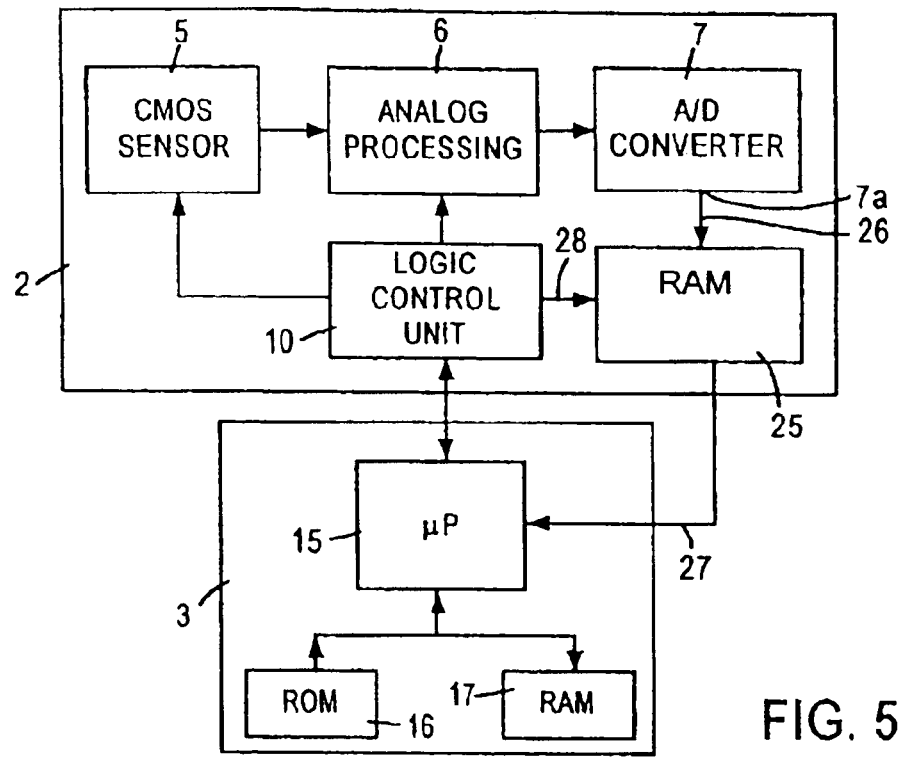
FIG. 5 shows a block diagram of the device according to a fifth embodiment of the invention.

FIG. 5 shows a device 1 which has the same elements as the device of FIG. 1 (and which are therefore indicated with the same reference numbers) and also an addition memory 25 of volatile type (RAM) connected between A/D converter 7 and microprocessor 15. In detail, the additional memory 25 is connected to output 7a of A/D converter 7 via a line 26, to microprocessor 15 via a data and address bus 27 and to logic control unit 10 via a line 28.

The additional memory 25 is part of the image detector 2 and stores the digital image formed by a plurality of dots, the digital value whereof is supplied by A/D converter 7. Thereby, a dedicated component outside image detector 2 is not necessary for image storing.

In the device 1 of FIG. 5, microprocessor 15 can access additional memory 25 directly via data bus 27, when it is necessary to access the image, and it can access its own RON memory 16 and R memory 17, when executing the program or acceding to its own private data other than the image.

In addition, device 1 can be fully integrated (in a manner not shown) in a single chip with data and control transfer interface 35, or it can be only partially integrated, as previously described.

Figure 6:
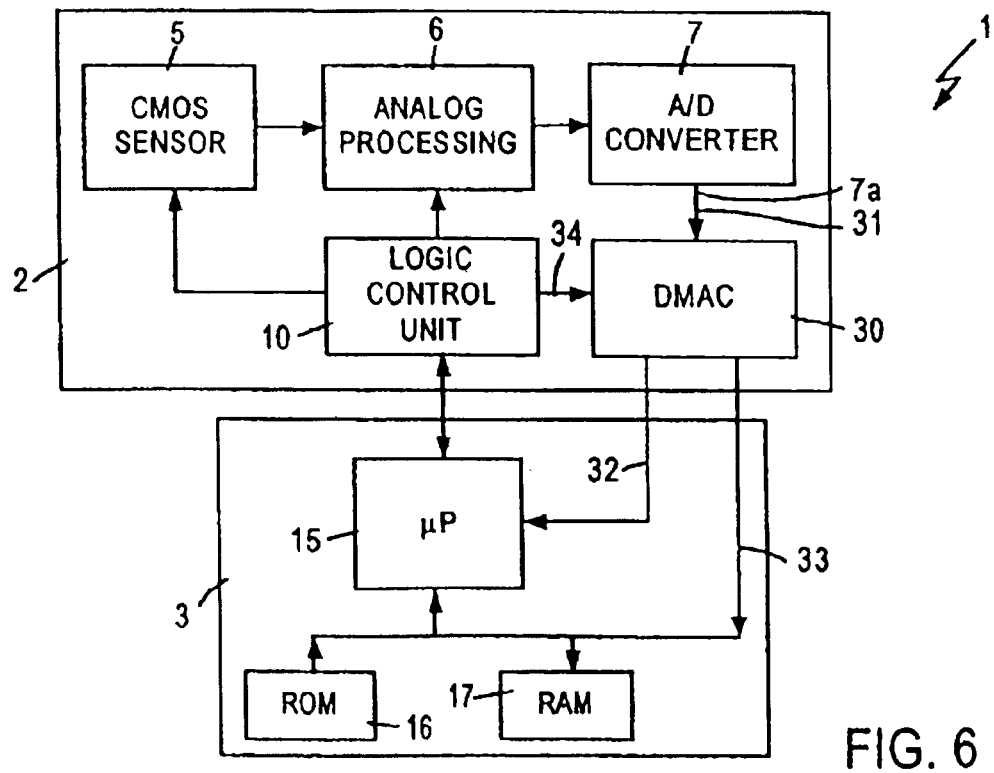
FIG. 6 shows a block diagram of the device according to a sixth embodiment of the invention.

FIG. 6 shows a device 1 having the same elements as the device of FIG. 1 and in addition a DMA (Direct Memory Access) controller 30, connected between A/D converter 7 and microprocessor 15. In detail, DMA controller 30 is connected to output 7a of A/D converter 7 via a line 31, to microprocessor 15 via a control line 32, to the same microprocessor 15, to ROM memory 3.6 and RAM memory 17 via a data bus 33 and to logic control unit 10 via a line 34.

DMA controller 30 is part of the image detector 2 and has the aim of quickly furnishing available digital image to microprocessor 15, by transferring it directly to RAM memory 17. In particular, when the image must be transferred to RAM memory 17, the DMA controller 30 requests the microprocessor 15 for control of the data bus 33, via the control line 32 and when it obtains this control, it generates the addresses and the control signals necessary to store the output image of A/D converter 7 directly in RAM memory 17. When the transfer has been-carried out, control of data bus 33 is returned to the microprocessor 1, which processes the image which has just been loaded.

The device 1 of FIG. 6 can also be integrated fully in a single chip, or in only part of it.

Figure 7:
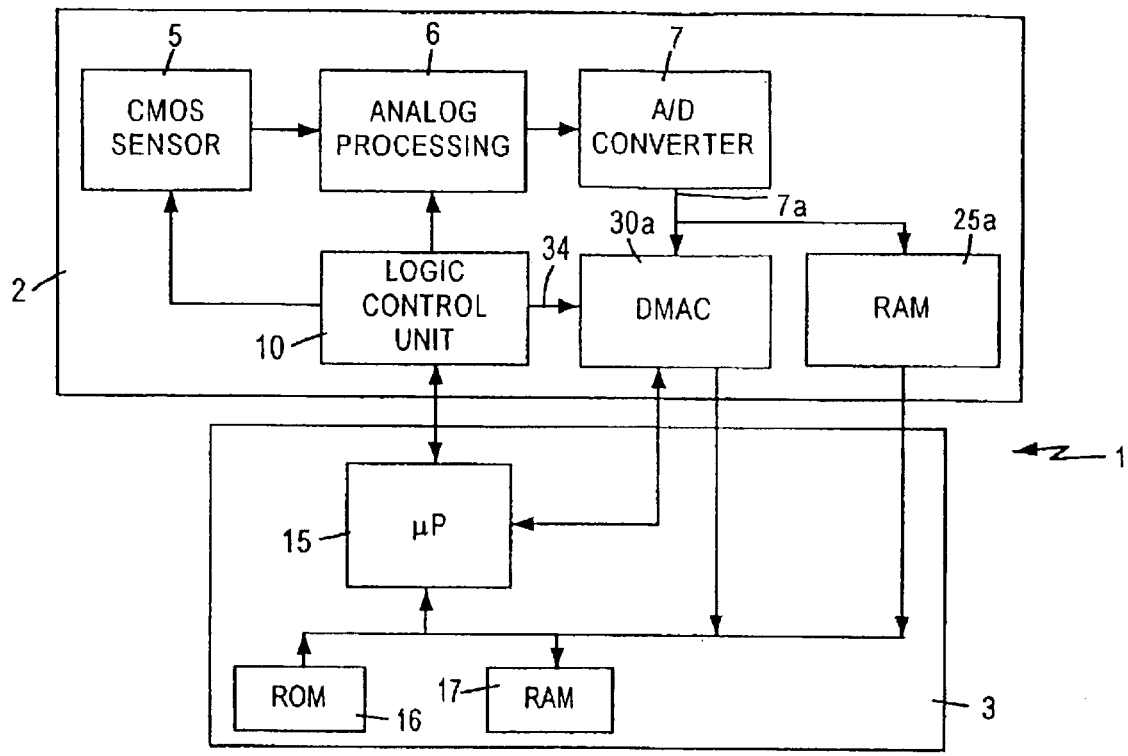
FIG. 7 shows a block diagram of the device according to a seventh embodiment of the invention.

FIG. 7 shows a device 1, having the same elements as the device of FIG. 1, and also an additional RAM memory 25a, similar to that of FIG. 5, and a DMA controller 30a, similar to that of FIG. 6. DMA controller 30a is connected in the same manner as that previously described with reference to FIG. 6 and the additional memory 25a is connected at its output directly to the data bus 33.

The device of 1 of FIG. 7 has the advantages of both the architecture of FIG. 5 and the architecture of FIG. 6. In fact, in this case, it is possible to create quickly a copy of the image contained in additional memory 25a into RAM memory 17 and to acquire a second image, thus making it possible to carry out comparisons between two successive images. This is very useful in the case of processing moving images and in general whenever algorithms are used to process images based on the comparison of two successive images.

Figure 8:
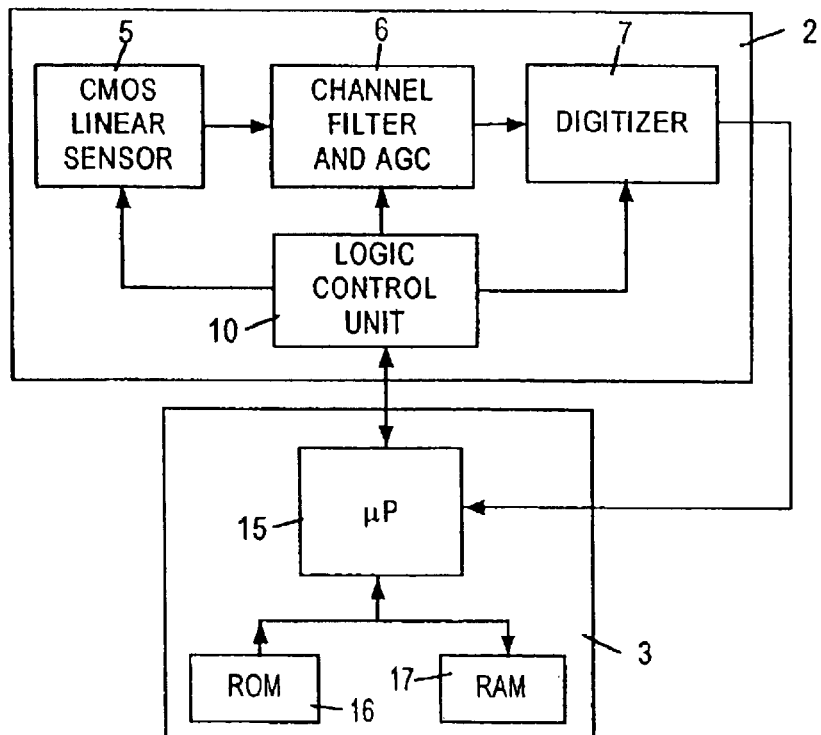
FIG. 8 shows a more detailed block diagram of the device of FIG. 1, according to a first variant.

FIG. 8 shows the more detailed architecture of a device 1, which has the general diagram shown in FIG. 1. In FIG. 8, CMOS sensor 5 is of linear type; analog processing unit 6 comprises a channel filter and an automatic gain control unit; and A/D converter 7 is of the 1-bit type (digitizer). In detail, the analog processing unit 6 has the task of selecting the useful band of the acquired signal, by filtering noise superimposed on the useful signal and automatically controlling the amplitude of the output signal supplied to A/D converter 7, thus adapting the gain to various operative conditions of contrast and intensity of the image acquired. Since A/D converter 7 operates with 1 bit, conversion is particularly simple and quick. Image detector 2 is integrated in a single chip and is connected to the external processing unit 3 formed by a microcontroller, including the microprocessor 15 and the corresponding ROM memory 16 and RAM memory 17.

Figure 9:
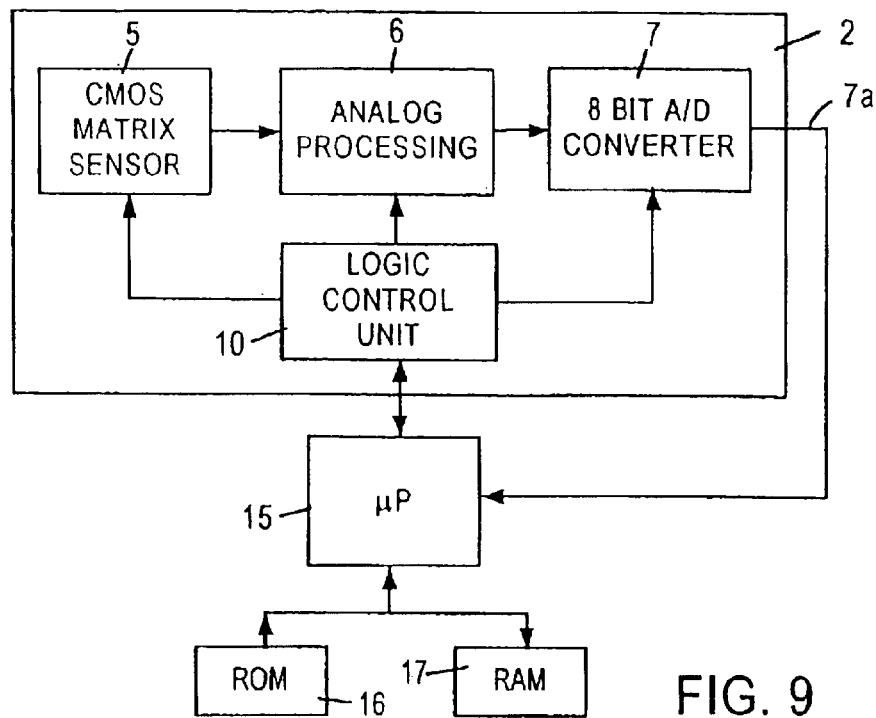
FIG. 9 shows a more detailed block diagram of the device of FIG. 1, according to a second, variant.

FIG. 9 shows more detailed architecture of another device 1, which has the general diagram shown in FIG. 1. In FIG. 9, CMOS sensor 5 is of matrix type; analog processing unit 6 comprises an analog circuit for signal amplification and A/D converter 7 is of 8-bit type, so that it supplies at output 7a a digital signal encoding each pixel according to one of 256 levels of grey. Image detector 2 is integrated in a single chip; microprocessor 15 is external, of RISC or CISC type, and is provided with a non-volatile memory 16 (consisting in this case of an external EPROM) and of a RAM memory 17.

The 8-bit A/D conversion limits the image transfer and processing complexity and speeds—up the image processing operations for acquiring data contained in the image.

Figure 10:
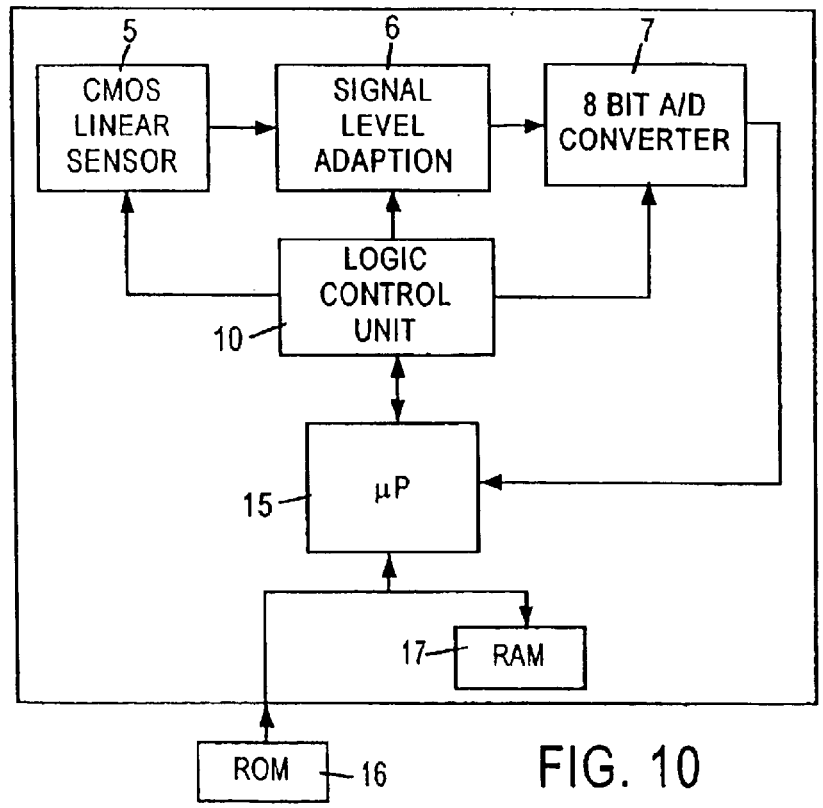
FIG. 10 shows a more detailed block diagram of the device of FIG. 1, according to a third variant.

According to another embodiment shown in FIG. 10, a single chip integrates a CMOS sensor 5 of linear type; an analog processing unit 6; an 8-bit A/D converter 7; a microprocessor' 15 and a RAM memory 17 for program data. In this solution; only ROM memory 16 is external.

In the device of FIG. 10, if the brightness level is known a priori (as in the case of contact readers), this is sufficient and thus the level of the signal supplied by CMOS sensor 5 is sufficient, analog processing unit 6 is omitted.

The 8-bit converter ensures that the signal is converted with higher resolution than in the case of FIG. 8. This solution thus makes it possible to simplify as far as possible, or even to eliminate analog processing of the signal and to implement algorithms for processing the images in more complex digital formats. Through these algorithms it is possible in particular to improve the reading performance, in case of codes with very low contrast, damaged codes etc.

Figure 11:
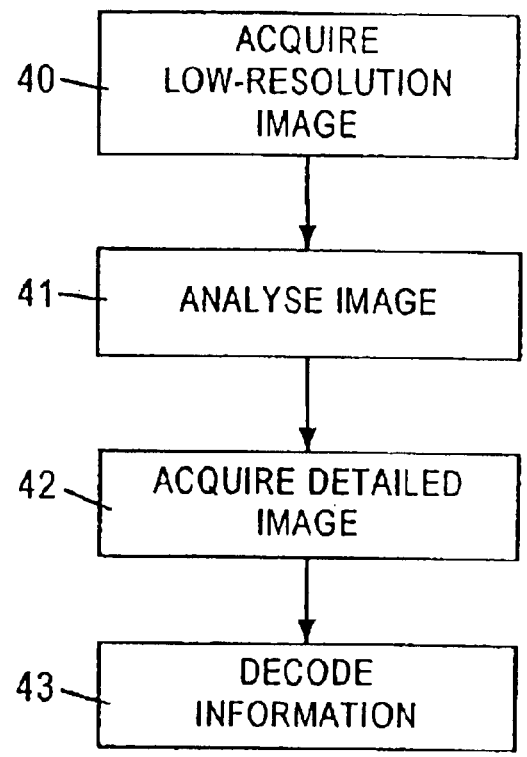
FIG. 11 illustrates a flowchart of a method for the acquisition and automatic processing of data according to the * invention.

To improve the reading speed, the device 1 functions as shown in the flowchart of FIG. 11. In particular, initially in which there is direct access to the pixels of the image detector 2, with reference to the flowchart of FIG. 11. It is assumed that a CMOS sensor 5 is used, wherein all pixels are the same and may be accessed directly by selecting lines 5 and columns which need not be adjacent, or by selecting rectangular windows of adjacent pixels, wherein the term "window" means a rectangular portion of the image with maximum resolution.

In this hypothesis, low-resolution acquisition 40 is carried out by a regular sub-sampling of the image with maximum resolution (thus obtaining for example a first image formed from one line out of every two and one column out of every two, of the image with maximum resolution).

The step of image analysis 43 is carried out by using an algorithm for identifying interest regions on the first image (reduced dimensions) obtained in step 40. This algorithm can for example search for the regions with greatest contrast and ignore the regions with low contrast, since the conventional optical codes use the alternation of light and dark regions to encode data. Thereby, a list of interest regions is obtained.

The step of high-resolution acquisition 42 then comprises acquiring, for each interest region, only the window containing the interest region, at the maximum resolution. The decoding step 43 then applies the decoding algorithm to each portion of thus obtained image.

Figure 12A:
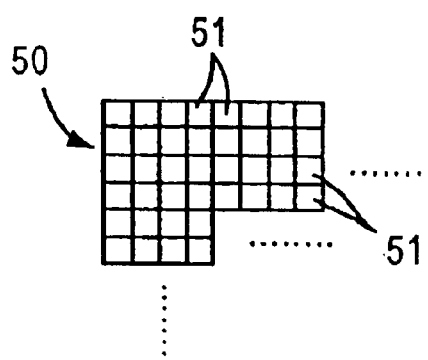
FIGS. 12a and 12b show two portions of a sensor used in the present device.
Figure 12B:
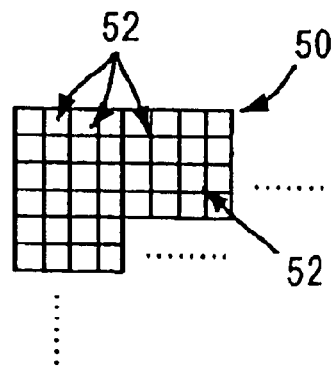

A different acquisition method is now described, using variable shape pixels. In particular, it is assumed that a CMOS sensor 5 is used, wherein all pixels are the same and adjacent pixels can be grouped together by hardware so as to be physically connected to one another through controllable switches in order to obtain macropixels with larger dimensions. In this respect, see FIGS. 12a and 12b relative to a portion 50 of a CMOS sensor 5, formed from a plurality of elementary sensors 51, each of which supplies a corresponding pixel; in FIG. 12a, the elementary sensors 51, are distinct, whereas in FIG. 12b the elementary sensors 51 are grouped together such as to provide macropixels 52, formed by 2×2 pixels. The macropixels 52 are then used and managed as single units, associated with a brightness value correlated to the average of the brightness of the elementary 10 pixels. Thereby, images are generated having lower resolution than the maximum, that is when each individual elementary pixel 5 is independently used.

According to the variable-shape pixel method and with reference to FIG. 11, the low-resolution acquisition step 40 comprises a first step, wherein adjacent pixels are grouped together by hardware, on the basis of control signals generated by control unit 10, in turn controlled by the microprocessor 15, and a second step of acquiring a low resolution image, through the thus obtained macropixels. Then follow: analysis of image 41; high-resolution acquisition 42 (wherein the values of the individual pixels are acquired only, in the windows where interest regions have been localized) and decoding 43, similarly to the above-described 25 procedure with reference to the direct-access method.

According to another aspect of the present invention, pixels with a variable height are used. This approach is particularly advantageous to improve the reading capability in case of linear bar codes and stacked codes (i.e. obtained by superimposing a series of bar codes with a very low height). Specifically, this method is based either on the possibility of producing macropixels with a rectangular shape and a different number of elementary pixels, or on the possibility of configuring height and active area of the pixel of the CMOS sensors in the manner described.

Figure 13A:
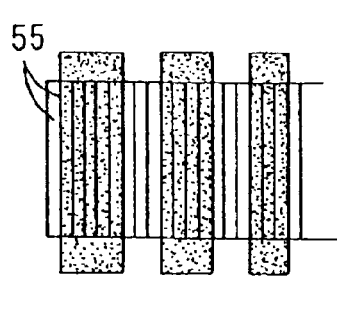
FIGS. 13a, 13b and 13c show optical codes superimposed on a grid representing a first shape of the pixels of the image acquisition system.
Figure 14A:
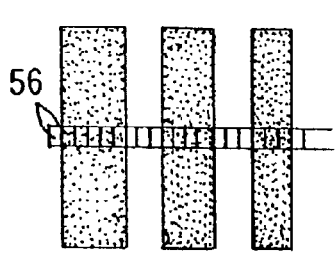
FIGS. 14a, 14b and 14c show optical codes superimposed on a grid representing a second shape of the pixels of the image acquisition system.

Specifically, for reading linear bodes (conventional bar codes), use of sensors with rectangular pixels having vertical dimensions much greater than horizontal dimensions (considering as horizontal the direction of the reading line), makes it possible to obtain a relatively broad sensitive detection area with respect to the horizontal dimension; thereby giving greater sensitivity and a better signal to noise ratio, as is immediately apparent by comparing FIGS. 13a and 14a, relative to the reading of a single bar code, respectively with pixels 55 with a high height to width ratio (which in the example illustrated is far greater than 10) and with pixels 56 with a height to width ratio which is close to 1.

Figure 13B:
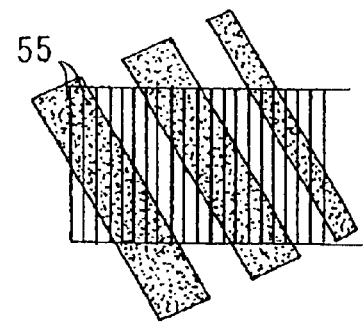
Figure 13C:
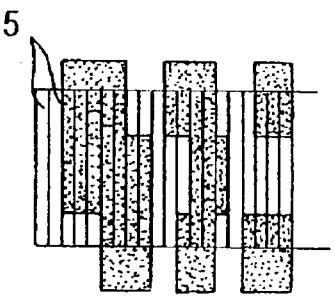
Figure 14B:
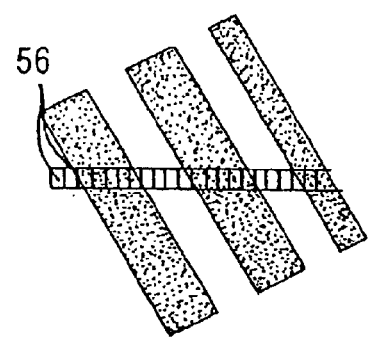
Figure 14C:
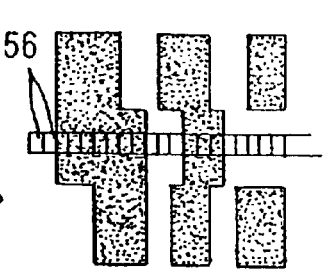

On the other hand, sensors with a reduced pixel height are advantageous in reading optical codes having elements not in line with the pixels (FIGS. 13b and 14b), or in reading stacked codes (FIGS. 13c and 14c).

In particular the configurability of the pixel shape in CMOS sensors can be obtained by reducing appropriately the sensing area of each pixel. In fact, as is known, each CMOS pixel is formed by a photoelement generating at the output an electric current correlated to the received light quantity and used to charge a storage capacitor. The photoelement has superimposed a gate element, whose biasing makes it possible to isolate a portion of the facing sensing area, thus activating only part of the photoelement sensing area. Therefore, with a sensing area of rectangular shape, such as that shown in fig-tires 13a (for example of 200×14 μm) and by appropriately biasing the gate electrode of each pixel, it is possible to modify the shape of each pixel; for example, it is possible to activate, only one end of each sensing' area, thus obtaining pixels with a substantially square shape, as shown in FIGS. 14a–14c, or portions with increasing height, until the maximum dimensions of FIGS. 13a–13b.

The above-described possibility of varying the shape of the pixels allows a same detector device to have two (or more) different operative configurations and thus to employ a single data acquisition device for different codes or in a priori unknown reading conditions (for example with unknown inclination of a bar code).

In this case, an algorithm maybe implemented, initially attempting reading with maximum height and reducing the height in case of unsuccessful reading. Height reduction can be gradual, if CMOS sensor 5 allows a discrete regulation of the pixel height to obtain a plurality of different heights.

Figure 15:
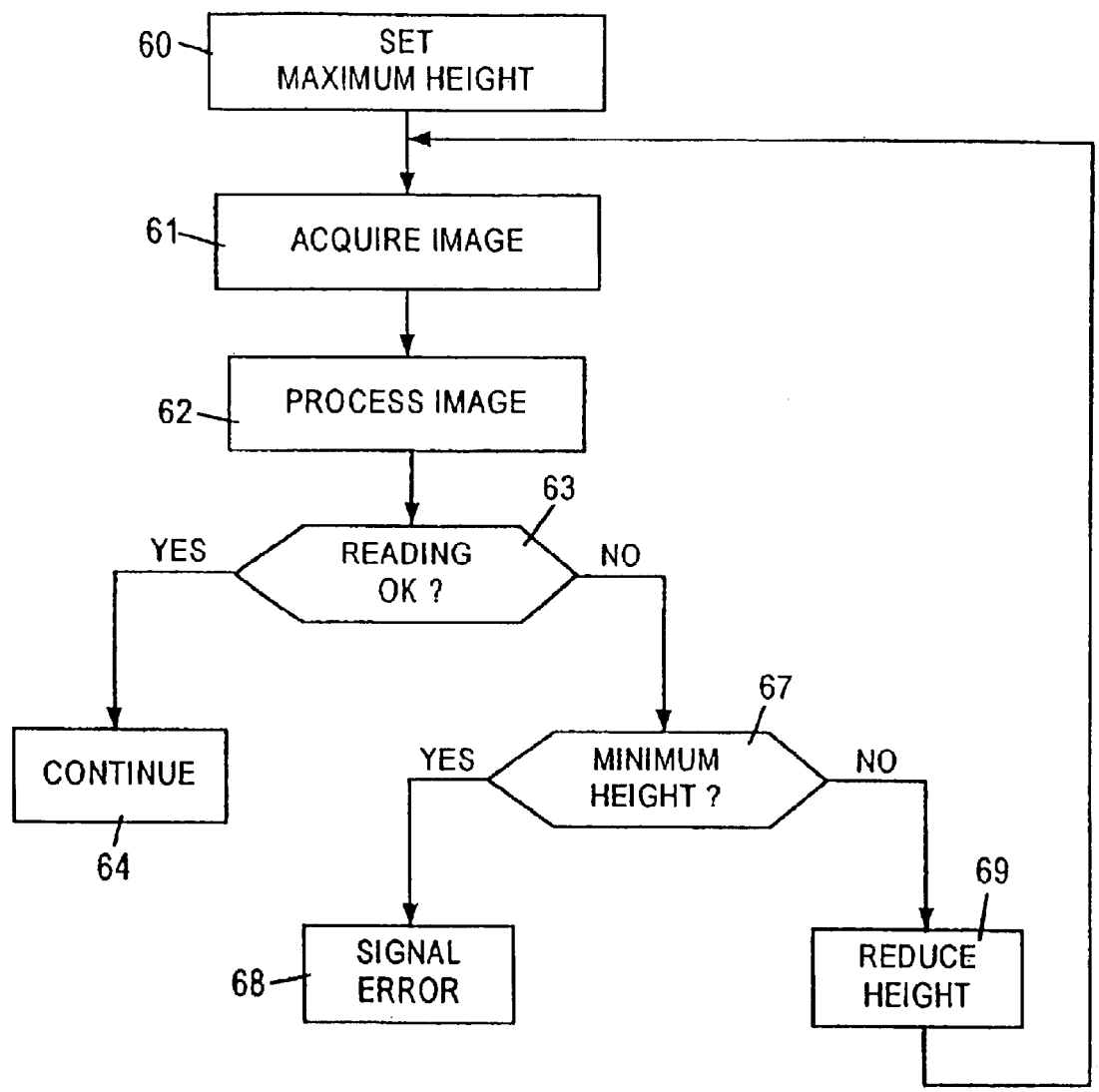
FIG. 15 illustrates a flowchart of a variant of the method for automatic data acquisition according to the invention.

In this case, the data acquisition device with variable shape pixels can operate according to FIG. 15. In detail, the maximum pixel height is initially set (block 60); the image (or at least a reduced, trial portion of it) is then acquired (block 61); the acquired image is processed to extract coded data, for example for localizing interest regions, or is pre-processed to evaluate whether the image is sufficient to extract data, block 62; it is verified whether reading has been successful, block 63; if so, (YES, output from block 63), processing is continued (completion of image processing or use of the extracted data, block 64); if not (NO output from block 63), it is verified whether the pixels are already at minimum height (block 67). If so (YES output from block 67), an error signal is generated (block 68, to indicate that reading is impossible); if not (NO output from block 67), the pixel height is reduced, block 69, and the image is acquired another time, returning to block 61.

The advantages of the described device and method are as follows. Firstly, they allow integration in a single chip of both the sensor and at least part of the VLSI logic circuits, thus reducing the costs for the components and packaging of the entire device; in addition, they exploit the inherent s advantages of CMOS technology for reading optical coded data; in particular, they allow acquisition of selective image sub-sets, on the basis of the image processing stage thus simplifying and speeding up data processing.

The present device can be produced according to one of the various above-described architectures, according to the specific application requirements and specific characteristics.

The possibility of integrating significant portions of the device in a single chip permits firstly reduction of the device dimensions (which is particularly advantageous in case of manual optical readers, physically supported by an operator) and secondly, reduction of the processing times and interferences caused by connections, wires etc.

Finally, it is apparent that many modifications and variants can be made to the device and the method described and illustrated here, all of which come within the context of the invention, as defined in the attached claims. In particular, the various blocks described with reference to specific architectures can also be used in different architectures, in accordance with very varied combinations, on the basis of the specific requirements.

What is claimed is:

1. A device for the acquisition of data obtained from optical codes, comprising:
    an image detector for generating signals correlated to the brightness of at least one image, said image detector comprising a CMOS optical sensor having a plurality of pixels; and
    a control unit for supplying at least one control signal for acquiring signals from said CMOS optical sensor according to a first configuration and at least one second configuration of pixels, said first configuration being suitable for acquiring a first type of optical code and said at least one second configuration being suitable for acquiring at least one second type of optical code different from the first type, and wherein said first and second configurations are different one from the other at least in one of a shape and a dimension of the respective pixels.

2. A device according to claim 1, wherein, in said first configuration, each of said respective pixels has at least a first dimension and wherein, in said at least one second configuration, each of said respective pixels has at least a corresponding second dimension different from the first dimension.

3. A device according to claim 2, wherein said first type of optical code is a linear code, said second type of optical code is a stacked code, and wherein said first dimension is greater than said second dimension.

4. A device according to claim 2, wherein in said first configuration, each of said respective pixels has a rectangular shape, and wherein said first dimension defines a vertical dimension of said rectangular shape and said vertical dimension is greater than a horizontal dimension orthogonal thereto.

5. A device according to claim 4, wherein said first type of optical code is a linear code and said vertical dimension is at least ten times greater than said horizontal dimension.

6. A device according to claim 1, wherein, in said first configuration, each of said respective pixels has a first shape and wherein, in said at least one second configuration, each of said respective pixels has at least a second shape different from the first shape.

7. A device according to claim 6, wherein said first type of optical code is a linear code, said second type of optical code is a stacked code, said first shape is rectangular and said second shape is substantially square.

8. A device according to claim 6, wherein said first type of optical code is a linear code and said first shape is rectangular having a vertical dimension and a horizontal dimension orthogonal thereto, and wherein said vertical dimension is at least about ten times greater than said horizontal dimension.

9. A device according to claim 1, wherein said CMOS optical sensor comprises a plurality of elementary pixels and said control unit supplies at least one control signal for grouping elementary pixels together into pixels such that each of said pixels comprises at least one elementary pixel and wherein, in said first configuration, each of said respective pixels comprises a first number of elementary pixels, and in said at least one second configuration, each of said respective pixels comprises a second number of elementary pixels different from the first number.

10. A device according to claim 9, wherein, in said first configuration, each of said respective pixels has at least a first dimension and wherein, in said at least one second configuration, each of said respective pixels has at least a corresponding second dimension different from the first dimension.

11. A device according to claim 10, wherein said first type of optical code is a linear code, said second type of optical code is a stacked code and said first dimension is greater than said second dimension.

12. A device according to claim 9, wherein, in said first configuration, each of said respective pixels has a first shape and wherein, in said at least one second configuration, each of said respective pixels has at least one second shape different from the first shape.

13. A device according to claim 12, wherein said first type of optical code is a linear code, said second type of optical code is a stacked code, said first shape is rectangular and said second shape is substantially square.

14. A device according to claim 1, wherein said CMOS optical sensor comprises a plurality of pixels each having a corresponding sensing area and said control unit is adapted to supply at least one control signal for modifying the sensing area of at least a portion of said plurality of pixels such that, in said first configuration, each of said respective pixels has a first sensing area, and in said at least one second configuration, each of said respective pixels has a second sensing area different from the first sensing area.

15. A device according to claim 14, wherein, in said first configuration, each of said respective pixels has at least a first dimension and wherein, in said at least one second configuration, each of said respective pixels has at least a corresponding second dimension different from the first dimension.

16. A device according to claim 15, wherein said first type of optical code is a linear code, said second type of optical code is a stacked code and said first dimension is greater than said second dimension.

17. A device according to claim 14, wherein, in said first configuration, each of said respective pixels has a first shape and wherein, in said at least one second configuration, each of said respective pixels has at least one second shape different from the first shape.

18. A device according to claim 17, wherein said first type of optical code is a linear code, said second type of optical code is a stacked code, said first shape is rectangular and said second shape is substantially square.

19. A device according to claim 1, wherein said control unit is comprised in said image detector.

20. A device according to claim 1, wherein said second configuration is obtained by modifying at least one of shape and a dimension of the pixels defining said first configuration.

21. A device according to claim 1, wherein said image detector further comprises an analog/digital conversion unit connected to said CMOS optical sensor for generating digital signals.

22. A device according to claim 21, wherein said image detector further comprises an analog processing unit interposed between said CMOS optical sensor and said analog/digital conversion unit.

23. A device according to claim 1, wherein said image detector has an output providing digital signals correlated to the brightness of said image, the device further comprising a data processing unit connected to said output of said image detector.

24. A device according to claim 1, further comprising a data processing unit connected to said image detector, and wherein said data processing unit further comprises said control unit.

25. A device for the acquisition of data obtained from optical codes, comprising:
    a CMOS optical sensor comprising a plurality of pixels, said CMOS optical sensor configured to generate signals correlated to the brightness of at least one image; and
    acquisition means for acquiring signals from said CMOS optical sensor according to a first configuration and at least one second configuration of pixels, said first configuration being suitable for acquiring a first type of optical code and said at least one second configuration being suitable for acquiring at least one second type of optical code different from the first type, and wherein said first and second configurations are different one from the other at least in one of shape and a dimension of the respective pixels.

26. A device according to claim 25, wherein said CMOS optical sensor comprises a plurality of elementary pixels and said acquisition means comprises means for grouping elementary pixels together into pixels such that each of said pixels comprises at least one elementary pixel and wherein, in said first configuration each of said respective pixels comprises a first number of elementary pixels, and in said at least one second configuration, each of said respective pixels comprises a second number of elementary pixels different from the first number.

27. A device according to claim 25, wherein said CMOS optical sensor comprises a plurality of pixels each having a corresponding sensing area and said acquisition means comprises means for modifying the sensing area of at least a portion of said plurality of pixels such that, in said first configuration, each of said respective pixels has a first sensing area, and in said at least one second configuration, each of said respective pixels has a second sensing area different from the first sensing area.

28. A devise according to claim 25, wherein said second configuration is obtained by modifying at least one of a shape and/or a dimension of the pixels defining said first configuration.

29. A method for the acquisition of data obtained from optical codes, comprising the step of:
    a) acquiring at least one image through a CMOS optical sensor comprising a plurality of pixels,
    wherein said step a) comprises a step b) of acquiring signals from said CMOS optical sensor according to a first configuration and at least one second configuration of pixels, said first configuration being suitable for acquiring a first type of optical code and said at least one second configuration being suitable for acquiring at least one second type of optical code different from the first type, and wherein said first and second configurations are different one from the other at least in one of shape and a dimension of the respective pixels.

30. A method according to claim 29, wherein said CMOS optical sensor comprises a plurality of elementary pixels and wherein step b) comprises the step of:
    grouping elementary pixels together into pixels such that each of said pixels comprises at least one elementary pixel and such that in said first configuration, each of said respective pixels comprises a first number of elementary pixels, and in said at least one second configuration, each of said respective pixels comprises a second number of elementary pixels different from the first number.

31. A method according to claim 29, wherein said CMOS optical sensor comprises a plurality of pixels each having a corresponding sensing area and wherein step b) comprises the step of:
    modifying the sensing area of at least a portion of said plurality of pixels such that, in said first configuration, each of said respective pixels has a first sensing area, and in said at least one second configuration, each of said respective pixels has a second sensing area different from the first sensing area.

32. A method according to claim 29, wherein step b) comprises the steps of:
    b1) acquiring a first image by acquisition of signals from said CMOS optical sensor according to said first configuration of pixels;
    b2) processing said image to extract optical coded data therefrom;
    b3) attempting a reading of said extracted optical coded data;
    b4) verifying whether the reading attempt of said step b3) has been successful;
    b5) if the verification of said step b4) has a negative result, acquiring a second image by acquisition of signals from said CMOS optical sensor according to said at least one second configuration of pixels.

33. A method according to claim 29, wherein said second configuration is obtained by modifying at least one of shape and a dimension of the pixels defining said first configuration.

34. A device for the acquisition of data obtained from optical codes, said device being connectable to a data-processing unit, the device comprising:
    an image detector adapted to acquire at least one image by acquisition of signals correlated to the brightness of said image, said image detector comprising a CMOS optical sensor having a plurality of pixels; and
    a control unit for supplying at least one control signal adapted to acquire signals from said CMOS optical sensor according to a first configuration and at least one second configuration of pixels, said first and second configurations being different one from the other at least in one of shape and a dimension of the respective pixels, wherein said data-processing unit is adapted to:
    receive from said device a first image, acquired by said image detector by acquisition of signals from said CMOS optical sensor according to said first configuration of pixels, process said first image to extract optical coded data therefrom, and attempt a reading of said extracted optical coded data, and wherein said control unit is adapted to supply at least one control signal for acquiring signals from said CMOS optical sensor according to said second configuration of pixels when said reading attempt is unsuccessful.

35. A device according to claim 34, wherein, in said first configuration, each of said respective pixels has at least a first dimension and wherein, in said at least one second configuration, each of said respective pixels has at least a corresponding second dimension different from the first dimension.

36. A device according to claim 35, wherein said first dimension is greater than said second dimension.

37. A device according to claim 34, wherein said CMOS optical sensor comprises a plurality of elementary pixels and said control unit is adapted to supply at least one control signal for grouping elementary pixels together into pixels such that each of said pixels comprises at least one elementary pixel and wherein, in said fist configuration, each of said respective pixels comprises a first number of elementary pixels, and in said at least one second configuration, each of said respective pixels comprises a second number of elementary pixels different from the first one.

38. A device according to claim 34, wherein said CMOS-optical sensor comprises a plurality of pixels each having a corresponding sensing area and said control unit is adapted to supply at least one control signal for modifying the sensing area of at least a portion of said plurality of pixels such that, in said first configuration, each of said respective pixels has a first sensing area, and in said at least one second configuration, each of said respective pixels has a second sensing area different from the first sensing area.

39. A device according to claim 34, wherein said second configuration is obtained by modifying at least one of shape and a dimension of the pixels defining said first configuration.

40. A device according to claim 34, wherein said data-processing unit is contained in said device.

41. A device according to claim 40, wherein said data-processing unit is connected to said image detector and said control unit is contained in said data-processing unit.

42. A device according to claim 34, wherein said control unit is contained in said image detector.

43. A device for the acquisition and processing of data obtained from optical codes, comprising:

acquisition means for acquiring at least one first image, through a CMOS optical sensor having a plurality of pixels, by acquisition of signals according to a first configuration of pixels, means for processing said first image to extract optical coded data therefrom; and means for attempting a reading of said extracted optical coded data;

wherein, when said reading attempt is unsuccessful, said acquisition means is adapted to acquire at least one second image by acquisition of signals according to at least one second configuration of pixels, wherein said first and second configurations are different one from the other at least in one of shape and a dimension of the respective pixels.

44. A device according to claim 43, wherein said second configuration is obtained by modifying at least one of shape and a dimension of the pixels defining said first configuration.

45. A method for the acquisition and processing of data obtained from optical codes, comprising the steps of:

a) acquiring a first image through a CMOS optical sensor comprising a plurality of pixels, said first image being acquired by acquisition of signals from said CMOS optical sensor according to a first configuration of pixels;

b) processing said image to extract optical coded data therefrom;

c) attempting a reading of said extracted optical coded data;

d) verifying whether the reading attempt of said step c) has been successful; and e) if the verification of said step d) has a negative result, acquiring a second image by acquisition of signals from said CMOS optical sensor according to at least one second configuration of pixels.

wherein said second configuration is different from the first configuration in that, in said first configuration, each of said respective pixels has at least a first dimension and, in said at least one second configuration, each of said respective pixels has at least a corresponding first dimension different from the first dimension of the first configuration;

wherein, in at least one of said first and second configurations, each of said respective pixels has a rectangular shape, and wherein said first dimension defines a vertical dimension of said rectangular shape and said vertical dimension is greater than a horizontal dimension orthogonal thereto.

46. A method according to claim 45, wherein said second configuration is obtained by modifying at least one of shape and a dimension of the pixels defining said first configuration.

* * * * *

UNITED STATES PATENT AND TRADEMARK OFFICE
CERTIFICATE OF CORRECTION

PATENT NO. : 7,102,116 B2
APPLICATION NO. : 10/816908
DATED : September 5, 2006
INVENTOR(S) : Federico Canini, Marco Piva and Rinaldo Zocca It is certified that error appears in the above-identified patent and that said Letters Patent is hereby corrected as shown below:

Column 2, line 48, delete "10";
Column 3, line 4, delete "*";
Column 3, line 17, delete "OP" and insert therefor --OF--;
Column 3, line 34, delete "*";
Column 3, line 39, delete "30";
Column 3, line 40, delete "arid" and insert therefor --and--;
Column 3, line 49, delete "5";
Column 3, line 53, delete second instance of "10";
Column 4, line 6, delete "30";
Column 4, line 12, delete "arid" and insert therefor --and--;
Column 4, line 14, delete "5";
Column 4, line 37, delete "30*";
Column 4, line 38, delete "--";
Column 4, line 42, delete "5,6" and insert therefor --5, 6--;
Column 4, line 44, delete "5";
Column 4, line 48, delete "1" and insert therefor --large--;
Column 5, line 19, delete "(";
Column 5, line 26, delete "addition" and insert therefor --additional--;
Column 5, line 40, delete "RON" and insert therefor --ROM--;
Column 5, line 40, delete "R" after the word "and" and insert therefor --RAM--;
Column 5, line 54, delete "3.6" and insert therefor --16--;
Column 5, line 65, delete "-";
Column 5, line 66, delete "1" and insert therefor --15--;
Column 6, line 10, delete "of" after the word device;
Column 6, line 55, delete ";" and insert therefor --,--;
Column 7, line 7, delete "5";
Column 7, line 16, delete "43" and insert therefor --41--;
Column 7, line 18, insert --with-- after "(" and before the word "reduced";
Column 7, line 45, delete "10";
Column 7, line 47, delete "5" and insert therefor --51--;
Column 7, line 59, delete "25"
Column 8, line 3, delete "bodes" and insert therefor --codes--;

UNITED STATES PATENT AND TRADEMARK OFFICE
CERTIFICATE OF CORRECTION

PATENT NO.       : 7,102,116 B2
APPLICATION NO.  : 10/816908
DATED            : September 5, 2006
INVENTOR(S)      : Federico Canini, Marco Piva and Rinaldo Zocca It is certified that error appears in the above-identified patent and that said Letters Patent is hereby corrected as shown below:

Column 8, line 30, delete "fig-tires" and insert therefor --FIG.--;
Column 8, line 44, delete "maybe" and insert therefor --may be--;
Column 9, line 3, delete "s" after the word "inherent."

Signed and Sealed this

Twenty-fifth Day of March, 2008

JON W. DUDAS
*Director of the United States Patent and Trademark Office*